United States Patent
Litle

[11] 3,879,860
[45] Apr. 29, 1975

[54] ELECTRONIC TEACHING AID

[76] Inventor: Richard L. Litle, P.O. Box 110 H, Odessa, Mo. 64076

[22] Filed: Oct. 4, 1973

[21] Appl. No.: 403,456

[52] U.S. Cl. .............................................. 35/9 C
[51] Int. Cl. ............................................. G09b 7/06
[58] Field of Search ...................................... 35/9 C

[56] References Cited
UNITED STATES PATENTS

| | | | |
|---|---|---|---|
| 2,889,634 | 6/1959 | Bringmann | 35/9 C |
| 2,943,400 | 7/1960 | Griswold | 35/9 C |
| 3,661,393 | 5/1972 | Skebeck | 35/9 C UX |

Primary Examiner—Wm. H. Grieb
Attorney, Agent, or Firm—Lowe, Kokjer, Kircher et al

[57] ABSTRACT

A device capable of being used as a teaching aid and multiple choice testing equipment has an outer cover with a plurality of holes defined therein. A positionable (and changeable) answer key of substantially the same shape as the outer cover telescopically fits inside therof and has holes alignable with certain ones of the holes in the outer cover. An associated electric probe has a tip at one end with a light bulb on the other end. When the tip of the probe extends through both the outer cover and the answer key holes (as would be the case with the selection of a correct answer) the circuit to the light bulb will be completed and the bulb will be illuminated. Conversely, if the probe is inserted into a hole in the outer cover not having an aligned answer key hole, the circuit will remain broken and the light bulb will not illuminate.

4 Claims, 5 Drawing Figures

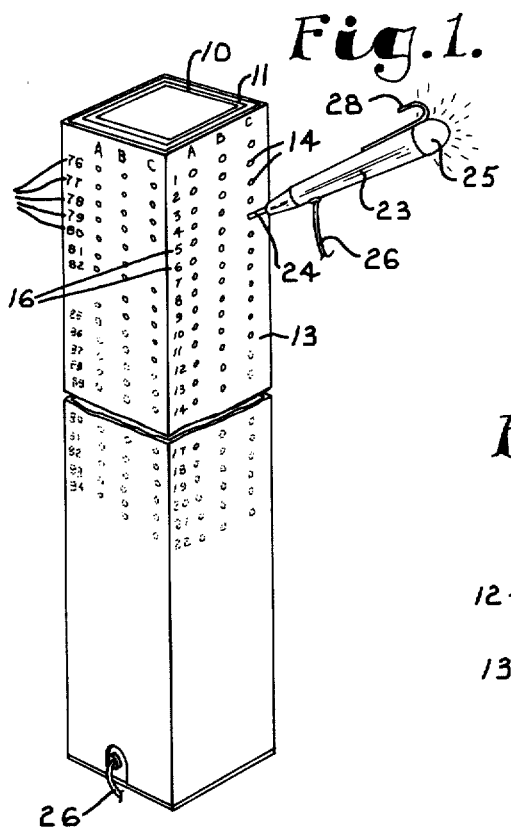
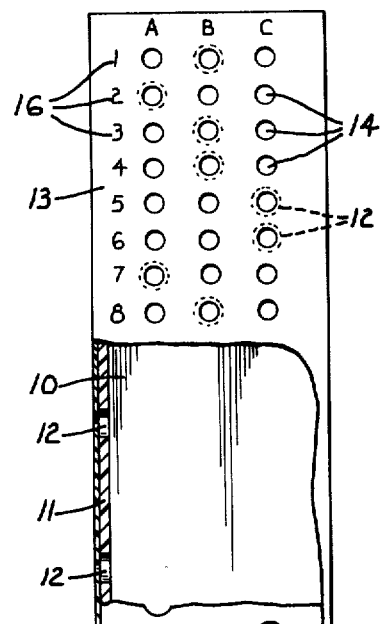
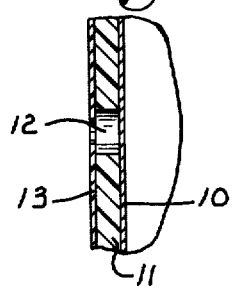
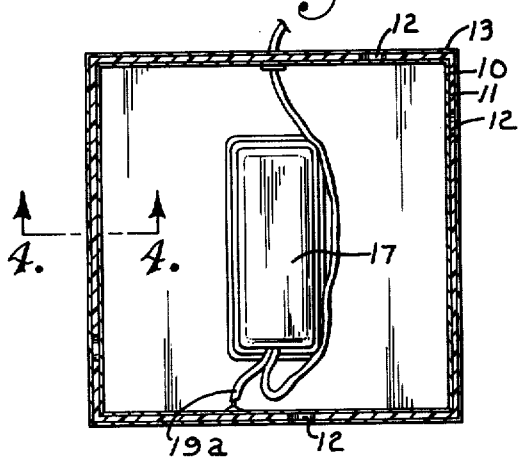
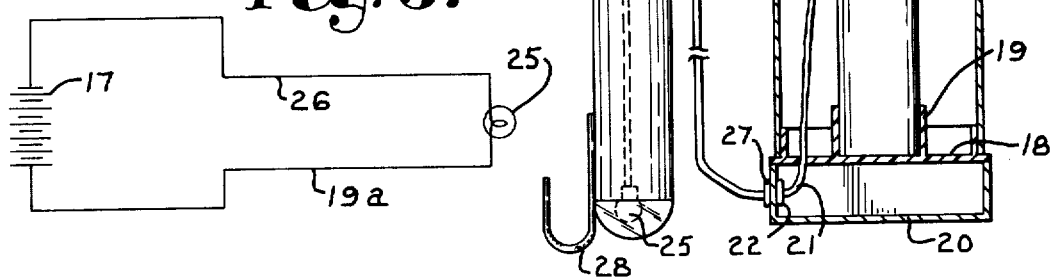

ELECTRONIC TEACHING AID

BACKGROUND AND BRIEF DESCRIPTION OF THE INVENTION

A teaching device operates to indicate correct answers to multiple choice (or true and false) examinations by providing for a means whereby a light bulb is illuminated when a probe is inserted into a hole in the device corresponding to the correct answer to a particular question. The device may be used by students who wish to ascertain the correct answers to the questions of multiple choice examinations and by teachers who correct multiple choice examinations, or it can otherwise be used as a teaching aid.

In order to be practical for these purposes the device must be inexpensive, light in weight for easy maneuverability, and durable enough to resist breakage. The device must also have easily changeable answer keys and a simple method of indicating the correct answers. This invention meets all of these requirements and is particularly characterized by a simple and novel method of changing answer keys and its electrical method of indicating correct answers.

An object of the invention is to provide a unique method and device for visually indicating (or audibly) when the correct answer to a multiple choice question is chosen.

Another object of the invention is to provide a compact device of the character described wherein answers to many questions can be checked for correctness, with a single multi-sided answer key.

A further object is to provide a device of the character described including a means for rotating and inverting one answer key in many different positions and with each different position providing a whooly different answer key for the associated device and method.

Other and further objects of the invention, together with the features of novelty appurtenant thereto, will appear in the course of the following description.

DETAILED DESCRIPTION OF THE INVENTION

In the accompanying drawings, which form a part of the specification and are to be read in conjunction therewith, and in which like reference numerals indicate like parts in the various views;

FIG. 1 is a perspective view of the invention shown in operating position;

FIG. 2 is a front view of the invention with portions being broken away to reveal the inner core, the hole in the answer key, and the electrical connection of the battery with the inner core and the probe;

FIG. 3 is a top plan view of the invention showing the electrical connection of the battery with the inner core;

FIG. 4 is a sectional view taken along the line 4-4 of FIG. 3 in the direction of the arrows and showing the inner core, the answer key and the outer cover; and FIG. 5 is a schematic diagram of the electrical circuit as completed when the tip of the probe contacts the inner core.

Turning now more specifically to the drawings, an inner core 10 is depicted as a square shaped (when viewed from the end) tubular structure constructed of an electrically conducting metal such as copper or aluminum or the like. Circumscribing the inner core 10 is an answer key 11 of a similar shaped, but slightly larger in outer perimeter than the inner core 10 so that it can be fixedly located adjacent and exteriorly of the inner core 10. It is contemplated that answer key 11 will be made of a lightweight, thin walled, durable, electrically insulated material such as plastic and that a series of holes 12 will extend through each of the four sides of the answer key 11. As a general rule, there will be only one hole 12 in each horizontal row in each side of the answer key 11 (and correspondingly only one correct answer per row). These holes 12 will generally be arranged asymmetrically and in an irregular arrangement on each side of the answer key 11 and in a completely different pattern on each side.

An outer cover 13 encloses answer key 11 which telescopingly fits over the outer perimeter of the answer key 11. The outer cover 13 is conveniently constructed of a lightweight, durable, electrically insulating material such as plastic and has a plurality of holes 14 (slightly smaller than the holes 12 in the answer key 11) therein. These holes 14 are arranged in horizontal rows, usually with three holes in each horizontal row in each side of the outer cover 13, and in vertical columns. For example, 25 holes in each vertical column in each side of the outer cover 13 are herein shown. When the answer key 11 is placed within and adjacent to the outer cover 13, the holes 12 in the answer key 11 align with the holes 14 in the outer cover 13. In this manner, one hole 12 is aligned with one hole 14 in each horizontal row of holes 14 in each side of the outer cover 13. The rows and columns of holes in the sides of cover 13 are arranged in a symmetrical pattern about the horizontal and vertical axes of each side to enhance the versatility of the teaching device as will hereinafter be related.

For convenience, it is contemplated that the device will be marked as follows. The top on each side of the outer cover 13 directly above the three vertical columns with holes 14 will be indicated by letters A. B and C. Marked at the left-hand edge of each side of the outer cover 13, directly beside 25 horizontal rows of holes 14, are 25 numerals, 1-25. These numerals (1-25) are numbered consecutively 1 through 25 on one side of the outer cover 13, 26 through 50 on the second side of the outer cover 13, 51 through 75 on the third side of the outer cover 13, and 76 through 100 on the fourth side of the outer cover 13.

As clearly shown in FIGS. 2 and 3, a battery 17 is contained within inner core 10 upon a base 18 by means of spring clips 19 extending upwardly from the base 18. One pole of the battery 17 is connected to the inner core 10 by an insulated wire 19a. The other pole of the battery 17 is connected through a stand 20 by means of an insulated wire 21 and a plug 22.

The answer key 11 can be rotated and inverted with respect to the outer cover 13 so that same may be placed in eight different positions relative to the outer cover 13 and with each different position providing a wholly different answer key for full questioning (100 as illustrated). Thus one answer key 11 actually serves as eight different answer keys.

There are alternative methods by which this rotation and inversion of the answer key 11 may be accomplished. For example, the outer cover 13 is formed in the shape of a square tube with the answer key 11 and the inner core 10 (which are glued together) slidable upwardly until clear of the outer cover 13. The answer key may then be rotated, inverted, or rotated and inverted and replaced within the outer cover 13. If this method is used, the base 18 may be designed to slip inside the core as illustrated in FIG. 2.

Alternately, the outer cover 13 is folded into its tubular shape and secured in that shape by suitable means such as elastic band (not shown). The outer cover 13 may be unfolded by removing the elastic bands, the edges of the sides of the outer cover 13 serving as joints about which the outer cover 13 may be unfolded. After it is unfolded the outer cover 13 may be rotated or inverted and folded again around the answer key 11. If this method is used, the base 18 is fixed to the inner core 10.

Continuing on with the discussion of the illustrated embodiment, probe 23 contains a metal conducting tip 24 and a light bulb 25 that is electrically connected to the tip 24. An insulated wire 26 and a plug 27 electrically connect the bulb 25 to the plug 22 and thus to the battery 17. The probe 23 has an adjoining clip 28 which allows the probe 23 to be clipped onto and within the frame of the device when not being used.

When the outer cover 13 is placed over the answer key 11, the metallic tip 24 of the probe 23 may be inserted into one of the holes 14 in the outer cover 13. If this hole 14 corresponds to the correct answer to a question, the hole 14 into which tip 24 is inserted will be aligned with the hole 12 in the answer key 11. The tip 24 will extend through both aligned holes 12 and 14 and come into contact with the inner core 10, thus completing the circuit and illuminating the bulb 25. Accordingly, if hole 14, into which the tip 24 is inserted, does not correspond to the correct answer to the question, it will not be aligned with any hole 12 in the answer key 11, tip 24 will not pass through the answer key 11 and will not contact the inner core 10. Therefore, the circuit will remain broken and the bulb 25 will not be illuminated thereby visually indicating an incorrect answer to the attempted question.

It should be pointed out that this device could also substitute an audible tone in place of the illuminating bulb. In this manner a visually handicapped student would be better suited to utilize the invention.

From the foregoing, it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. An apparatus for indicating answers corresponding to multiple choice or true and false questions, said apparatus including:

an outer member comprising a plurality of sides, each of said sides having a plurality of holes therethrough corresponding to possible answers to said questions, the holes in each side being arranged symmetrically in rows and columns;

an inner member having a plurality of faces corresponding to the number of sides in said outer member, each of said faces containing a plurality of passages extending thereinto and arranged in an irregular pattern, the number of passages being less than the number of holes, said inner member being removably supportable within said outer member with each of said passages aligned with one of said holes, said inner member being rotatable and invertible with respect to said outer member to respectively align each of said passages with at least one hole in each of said sides; and a probe insertible in said holes and operable to indicate which of said holes are aligned with a passage, whereby the correct answers to said questions may be ascertained.

2. Apparatus as in claim 1, wherein said holes and passages are arranged to enable one of said passages to align with one of said holes in each of said rows.

3. Apparatus as in claim 1, including an electrical circuit comprising:

an electrically conductive core disposed inwardly of said inner member and positioned adjacent the inward ends of the passages thereof;

a battery mounted interiorly of said core and electrically coupled thereto;

an indicator on said probe electrically coupled to said battery and operable to emit a signal upon receiving current; and an electrically conductive tip on said probe, said tip being electrically coupled to said indicator and insertible through an aligned hole and passage to contact said core and thereby complete said circuit to actuate said indicator.

4. Apparatus as in claim 3, including means for supporting said probe within said core when not in use.

* * * * *